United States Patent [19]

Irwin

[11] 4,188,476
[45] Feb. 12, 1980

[54] AROMATIC POLYESTER CONSISTING ESSENTIALLY OF P-OXYBENZOYL UNITS, TEREPHTHALOYL UNITS, 2,6-DIOXYNAPHTHALENE OR 2,6-DIOXYANTHRAQUINONE UNITS AND M-OXYBENZOYL OR 1,3-DIOXYPHENYLENE UNITS

[75] Inventor: Robert S. Irwin, Wilmington, Del.

[73] Assignee: E. I. Du Pont de Nemours and Company, Wilmington, Del.

[21] Appl. No.: 27,939

[22] Filed: Apr. 6, 1979

[51] Int. Cl.$^2$ .................. C08G 63/18; C08G 63/60
[52] U.S. Cl. .................................. 528/190; 528/125; 528/128; 528/194
[58] Field of Search .............. 528/128, 125, 190, 194

[56] References Cited

U.S. PATENT DOCUMENTS

| | | | |
|---|---|---|---|
| 4,066,620 | 1/1978 | Kleinshuster et al. | 528/194 |
| 4,067,852 | 1/1978 | Calundann | 528/190 |
| 4,083,829 | 4/1978 | Calundann et al. | 528/190 |
| 4,118,372 | 10/1978 | Schaefgen | 528/190 |
| 4,130,545 | 12/1978 | Calundann | 528/190 |
| 4,146,702 | 3/1979 | Morris et al. | 528/190 |

*Primary Examiner*—Lester L. Lee

[57] ABSTRACT

An aromatic polyester which in filament form has improved responsiveness to heat strengthening consisting essentially of p-oxybenzoyl units, terephthaloyl units, 2,6-dioxynaphthalene or 2,6-dioxyanthraquinone units and m-oxybenzoyl, or 1,3-dioxyphenylene units.

8 Claims, No Drawings

AROMATIC POLYESTER CONSISTING ESSENTIALLY OF P-OXYBENZOYL UNITS, TEREPHTHALOYL UNITS, 2,6-DIOXYNAPHTHALENE OR 2,6-DIOXYANTHRAQUINONE UNITS AND M-OXYBENZOYL OR 1,3-DIOXYPHENYLENE UNITS

BACKGROUND OF THE INVENTION

1. Field of the Invention

This invention relates to fiber-forming melt-spinnable aromatic polyesters and to filaments thereof having high tenacity and high modulus.

2. Description of the Prior Art

A class of aromatic polyesters that form optically anisotropic melts from which oriented filaments can be melt spun has been described in Schaefgen et al. U.S. Pat. No. 4,118,372. Most polyesters which are disclosed in this patent are derived primarily from para-oriented dihydric phenols and para-oriented dicarboxylic acids. Filaments that are melt-spun from such polyesters can be heat treated to high tenacity and modulus. Other polyesters are disclosed in the aforementioned Schaefgen et al. patent which are copolymers derived from p-hydroxybenzoic acid, dihydric phenols and dicarboxylic acids.

Recent U.S. Pat. Nos. 4,067,852; 4,083,829; and 4,130,545 disclose polyesters consisting essentially of p-oxybenzoyl moieties, 2,6-dicarboxynaphthalene moieties and various other moieties. U.S. Pat. No. 4,130,545 refers to an application Ser. No. 832,147 which claims an aromatic polyester consisting essentially of p-oxybenzoyl moiety, 2,6-dioxynaphthalene moiety and terephthaloyl moiety. Applicant has made polyester consisting of such moieties and has melt-spun filaments from such polyester. He has found that such filaments are not as highly responsive to heat strengthening as desired but may become so by the additional incorporation of a small amount of a non-linear comonomer as described in detail below.

SUMMARY OF THE INVENTION

The present invention is directed to fiber-forming copolyesters that exhibit optical anisotropy in the melt and consist essentially of units I, II, III and IV having the structural formulas:

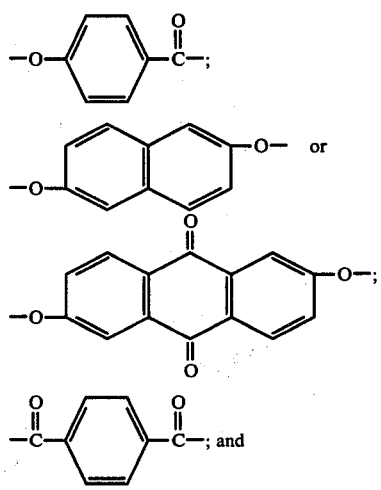

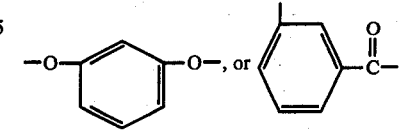

in the proportions of about 50–70 mol % of Unit I, about 10–23 mol % of Unit II, about 15–25 mol % of Unit III and from about 2 to 10 mol % of Unit IV. Melt-spun and heat strengthened filaments of such polyesters are also contemplated.

DETAILED DESCRIPTION OF THE INVENTION

The copolyesters of the invention consist essentially of units as described above. Units I and III are derived from p-hydroxybenzoic acid and terephthalic acid respectively. Unit II is derived from 2,6-naphthalenediol or 2,6-dihydroxyanthraquinone and Unit IV is derived from resorcinol, or m-hydroxybenzoic acid. In place of such compounds one may usefully employ functional equivalents thereof as the reactants for preparing the copolyesters.

The reactants are generally combined in proportions corresponding to the molar proportions of the units desired in the copolyester products. The p-hydroxybenzoic acid reactant needed for Unit I should be reacted in an amount sufficient to supply about 50 to 70 mol %, preferably about 55 and 65 mol %, of such units. At the upper end of this range, i.e., at about 70 mol %, there is a tendency towards polymer inhomogeneity. The reactant used to provide Unit IV should be reacted in an amount sufficient to supply about 2 to 10 mol % of such units. It is believed that lesser amounts will have little effect on the polymer properties while amounts exceeding 10 mol % will have a deleterious effect on filament tenacity and modulus. A quantity of terephthalic acid reactant should be used to provide about 15 to 25 mol % of Unit III and the fused ring diol reactant should be used in an amount to provide about 10 to 23 mol % of Unit II. It will be apparent that in the polyester product there will be equimolar quantities of units derived from diphenolic and dicarboxylic acid reactants respectively.

Conventional polymerization techniques may be employed such as described in the aforementioned U.S. Pat. No. 4,118,372 and more particularly in the examples described below. In general, a mixture of monomers (preferably with diacetates in up to 7% excess) are heated with stirring, under nitrogen, in a 250 ml 3-necked flask in a Wood's metal bath from approximately 200° C. to 320°–370° C. Polymerization is continued for up to a total of 0.5 to 4.0 hours until a fiber-forming molecular weight is reached but prior to excessive melt viscosity. Usually a vacuum, e.g., about 1.0 mm vacuum, is applied to obtain the final viscosity. The copolyesters of the invention exhibit optical anisotropy as determined by the thermooptical test (TOT) described in U.S. Pat. No. 4,118,372.

Filament Preparation

The (co)polyesters may be spun into filaments by conventional melt-spinning techniques. A melt of the polymer is extruded through a spinneret into a quenching atmosphere (e.g., air or nitrogen maintained at room temperature) and wound up.

As used herein, the term "as-spun" fiber refers to a fiber which has not been drawn or heat treated after extrusion and normal windup.

Heat Treatment and Utility

The as-spun fibers of this invention may be subjected to heat treatment in an oven while relaxed to provide high strength fibers useful for a variety of industrial applications such as plastic and rubber reinforcement. In the heat treating process, fiber samples, as skeins or on bobbins (preferably collapsible bobbins) are usually heated in an inert atmosphere that is continuously purged by flow of inert gas through the oven to remove by-products from the vicinity of the fiber. Temperatures approaching the fusion point but sufficiently below to prevent interfilament fusion are employed. Preferably the maximum temperature is reached in a stepwise fashion.

Measurements and Tests

Inherent Viscosity: Inherent Viscosity ($\eta$ inh) is defined by the following equation:

$$\eta inh = \frac{\ln (\eta rel)}{C}$$

wherein ($\eta$ rel) represents the relative viscosity and C represents a concentration of 0.5 gram of the polymer in 100 ml of solvent. The relative viscosity ($\eta$ rel) is determined by dividing the flow time in a capillary viscometer of the dilute solution of the polymer by the flow time for the pure solvent. The dilute solutions used herein for determining ($\eta$ rel) are of the concentration expressed by (C), above; flow times are determined at 25° C.; the solvent is a mixture by volume of 7.5% trifluoroacetic acid/17.5% methylene chloride/12.5% dichlorotetrafluoroacetone hydrate/12.5% perchloroethylene/50% 4-chlorophenol.

Filament Tensile Properties: Filament properties are measured on 2.54 cm sample lengths by the procedures shown in Morgan U.S. Pat. No. 3,827,998. Tenacity, T, and Modulus, Mi, are given in dN/tex. Denier, D, is given in dtex. Elongation, E, is given in percent of unstretched length. Unless otherwise indicated, breaks on 6 filaments were averaged because there was considerable spread in values. During heat-strengthening fibers are in a soft or near-plastic condition and sometimes come into contact. Light fusion at such points of contact results in surface defects which reduce fiber tensile properties. While it is possible to reduce the defects by application of suitable finishes before heat treatment, such finishes were not employed in these experiments. The highest brake value is given as the best indication of property potential.

Flow Temperature: Copolymer flow temperature is determined as described in U.S. Pat. No. 4,118,372. In some cases polymer stick temperature, i.e., temperature at which a piece of polymer which is pulled along a hot calibrated bar first sticks to the bar, is noted.

The following examples, except for Examples I and VI are illustrative of the present invention.

Procedure Employed in All Examples

For each copolyester preparation, there was employed a 250 ml 3-necked flask equipped with: (1) a glass stirrer; (2) a nitrogen inlet; (3) a short Vigreux column leading to a water-cooled condenser with a flask for collecting acetic acid; and (4) an electrically heated Wood's metal bath. Provision for application of a vacuum was in the distillation adapter.

The three-necked flask was charged with the reactants and heated with stirring, under nitrogen. In some instances, an excess over stoichiometric quantities was used. A vacuum was then applied to obtain the final viscosity.

The polymer was then melt-spun using a press spinner with a 0.23 mm diameter spinneret hole. Wind-up speed is indicated.

The filaments were loosely wound on a soft bobbin and heated in an oven in slowly flowing nitrogen. After this heating, averaged and best single values of tensile properties were determined.

EXAMPLE I (Control)

Using the procedures described above, a copolyester consisting of the following units in the molar proportions indicated was prepared:

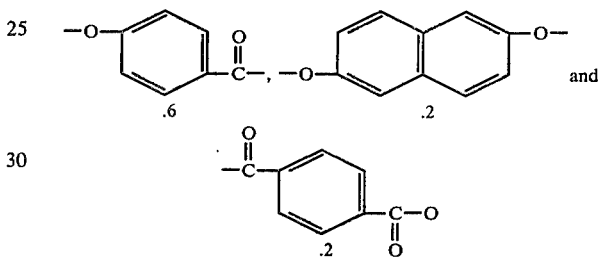

The reactants and quantities employed are listed below.

| | |
|---|---|
| p-acetoxybenzoic acid | 27.0 g |
| 2,6-naphthalenediol diacetate (3% excess) | 12.57 g |
| Terephthalic acid | 8.3 g |

The reaction mixture was heated from 280° C. to 350° C. over a 1 hr period. A vacuum was then applied and heating continued to 360° C. over an 8-minute period. The resulting polymer was insoluble in the solvent employed for inherent viscosity determination. The polymer was optically anisotropic in the melt. The flow temperature was 317° C.

The polymer was melt-spun at 385° C. to 395° C. and the wind-up speed was 550 m/min. The filament tensile properties T/E/Mi were 2.2/0.91/288. After heat treatment in an oven at 200°–304° C./6 hr and 304° C./7 hr, average filament (5 samples) properties, D/T/E/Mi, were 6.88/10.40/2.78/379. Highest tenacity was 12.58 dN/tex.

EXAMPLE II

Using the general procedure of Example, I, a copolyester consisting of the following units in the molar proportions indicated were prepared:

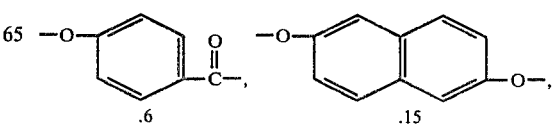

-continued

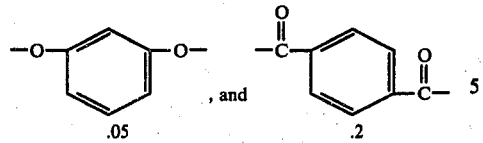

The reactants and quantities employed are listed below.

| | | |
|---|---|---|
| p-acetoxybenzoic acid | | 27.0 g |
| 2,6-naphthalenediol diacetate | (3% excess) | 9.42 g |
| resorcinol diacetate | (3% excess) | 2.50 g |
| terephthalic acid | | 8.30 g |

The reaction mixture was heated from 273° C. to 324° C. over 53 minutes at which time a vacuum was applied and heating continued to 328° C. over 20 minutes after which 328° C. was maintained for an additional 15 min. About 28 g of an optically anisotropic polymer was collected having an inherent viscosity of 1.83 and a flow temperature of 289° C.

The polymer was melt spun at 323° C. at 550 m/min, and the filament tensile properties T/E/Mi were 3.11/0.95/381. After heat treatment in an oven as in Example I but with the following heating schedule: 230° C./2 hr, 260° C./2 hr, 280° C./2 hr and 303° C./18 hr, the average filament tensile properties D/T/E/Mi were 10/12.6/4.15/338. Highest tenacity was 16.1 dN/tex.

The improved tenacity obtained in this and in the following Example III point up the improved responsiveness to heat strengthening that is obtained through the present invention.

EXAMPLE III

The procedures of Example II were followed to prepare copolyesters consisting of the same units as in Example II but with different molar quantities.

The reactants and quantities are listed below.

| | | Item 1 | Item 2 |
|---|---|---|---|
| p-acetoxybenzoic acid | | 27.0 g | 28.8 g |
| 2,6-naphthalenediol diacetate | (3% excess) | 11.0 g | 7.54 g |
| resorcinol diacetate | (3% excess) | 1.25 g | 3.00 g |
| terephthalic acid | | 8.30 g | 7.47 g |

The reaction mixtures of Items 1 and 2 were polymerized following the general, but not identical, procedures of Example II. Maximum polymerization temperatures were 339° C. and 346° C. respectively.

Item 1 copolyester (about 27 g) was obtained having an inherent viscosity of 2.21 and a flow temperature of 291° C. It was optically anisotropic.

Item 2 copolyester was collected having an inherent viscosity of 2.37 and a flow temperature of 292° C.

Each of Items 1 and 2 was melt-spun in a manner generally similar to that described in Example II.

Filament tensile properties T/E/Mi for filaments of Items 1 and 2 were 3.40/1.02/378 and 4.01/1.21/370 respectively. After heat treatment in a manner generally similar to that described in Example II (maximum temperatures 290° C. and 280° C., respectively), the average filament tensile properties D/T/E/Mi of filaments of Items 1 and 2 were 6.8/12.88/3.24/375 and 9.8/12.69/3.54/340 respectively. The highest tenacity for Item 1 was 14.62 dN/tex and for Item 2 was 16.60 dN/tex.

EXAMPLE IV

Using the general procedure of Example I, a copolyester consisting of the following units in the molar proportions indicated were prepared:

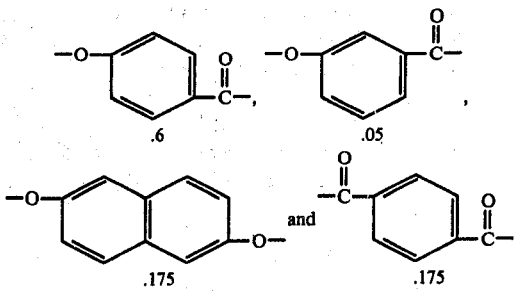

The reactants and quantities employed are listed below.

| | |
|---|---|
| p-acetoxybenzoic acid | 21.60 g |
| m-acetoxybenzoic acid | 1.80 g |
| 2,6-naphthalenediol diacetate (4% excess) | 8.88 g |
| terephthalic acid | 5.81 g |

The reaction mixture was heated from 282° C. to 334° C. over 36 minutes at which time a vaccum was applied and heating continued to 340° C. over 5 minutes. Polymer was collected having an inherent viscosity of 2.37 and a polymer stick temperature of about 286° C.

The polymer was melt-spun at 350° C. to 360° C. at 550 m/min. The filament tensile properties T/E/Mi were 3.61/0.98/331. After heat treatment, the average (8 filaments) filament tensile properties D/T/E/Mi were 6.55/15.13/3.08/451 with the highest tenacity of 18.04 dN/tex.

EXAMPLE V

Using the general procedure of Example I, a copolyester consisting of the following units in the molar proportions indicated was prepared:

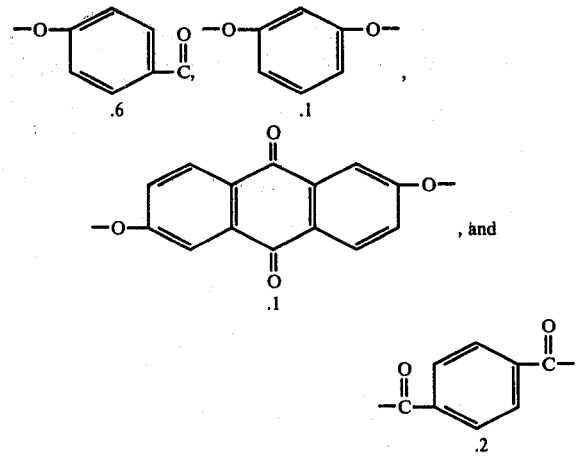

The reactants and quantities employed are listed below.

| | | |
|---|---|---|
| p-acetoxybenzoic acid | | 21.6 g |
| resorcinol diacetate | (3% excess) | 4.00 g |
| 2,6-anthraquinonediol diacetate | (1% excess) | 6.54 g |
| terephthalic acid | | 6.64 g |

The reaction mixture was heated from 289° C. to 340° C. over about 37 minutes at which time a vacuum was applied and heating continued at 340° C. over another 19 minutes. The polymer inherent viscosity was 1.49 and the polymer stick temperature was about 234° C.

The polymer was melt-spun at 370° C. to 376° C. to 288 m/min. The filament tensile properties T/E/Mi were 2.8/0.77/351 and after treatment D/T/E/Mi were 11.5/10.64/2.93/375 (average) with the highest tenacity being 14.57 dN/tex.

EXAMPLE VI (Control)

The general procedure of Example I was followed to prepare a copolyester consisting of the following units in the molar proportions indicated below.

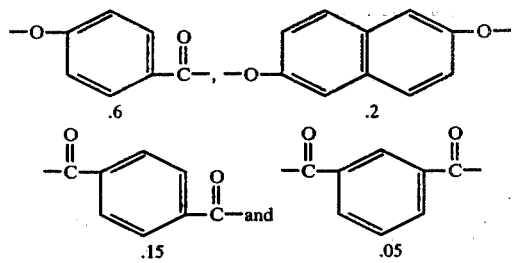

from the following reactants:

| | |
|---|---|
| p-acetoxybenzoic acid | 27.0 g |
| 2,6-naphthalenediol diacetate (4% excess) | 13.18 g |
| terephthalic acid | 6.23 g |
| isophthalic acid | 2.08 g |

The reactants were heated from 306° to 330° C. during 20 min, then to 340° C. during 35 min, then to 354° C. during 17 min. The product was a very viscous grainy melt, with an anisotropic appearance, from which only extremely weak, coarse fibers could be pulled.

Replacement of part of the dioxynaphthalene units of the polymer of Example I with 1,2-dioxyphenylene units, diminished rather than enhanced the filament tenacity achieved upon heat strengthening.

I claim:
1. Fiber-forming copolyesters consisting essentially of units I, II, III and IV having the structural formulas:

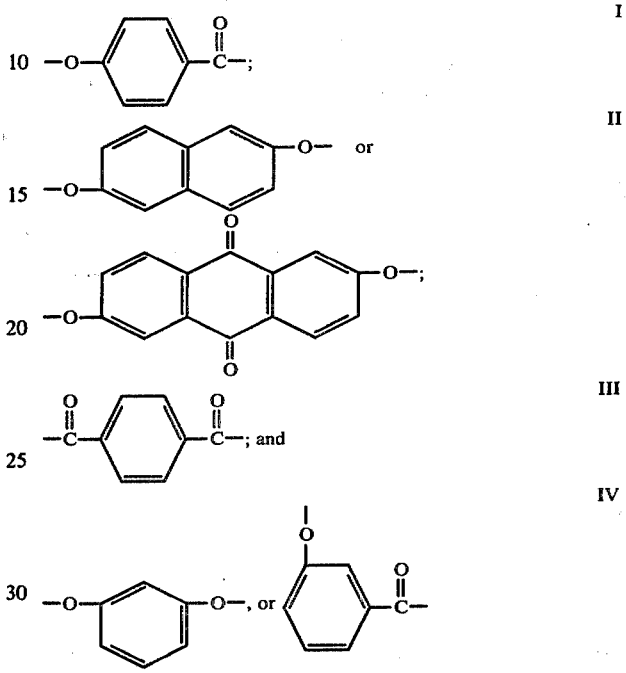

in the proportions of about 50–70 mol % of Unit I, about 10–23 mol % of Unit II, about 15–25 mol % of Unit III and from about 2 to 10 mol % of Unit IV.

2. A filament of a copolyester of claim 1.
3. A fiber-forming copolyester according to claim 1 wherein Unit I is present in an amount of from about 55 to 65 mol %.
4. A filament of a copolyester of claim 3.
5. A fiber-forming copolyester according to claim 3 wherein Unit II is 2,6-dioxynaphthalene and Unit IV is 1,3-dioxyphenylene.
6. A fiber-forming copolyester according to claim 3 wherein Unit II is 2,6-dioxynaphthalene and Unit IV is m-oxybenzoyl.
7. A filament of the copolyester of claim 5.
8. A filament of the copolyester of claim 6.